United States Patent
Wang et al.

[11] Patent Number: 5,958,606
[45] Date of Patent: Sep. 28, 1999

[54] SUBSTRATE STRUCTURE WITH ADHESIVE ANCHORING-SEAMS FOR SECURELY ATTACHING AND BODING TO A THIN FILM SUPPORTED THEREON

[75] Inventors: Chung-Hsiung Wang, Shung-Shi; Duen-Jen Cheng, Chutung, both of Taiwan

[73] Assignee: Cyntec Company, Hsinchu, Taiwan

[21] Appl. No.: 08/795,518

[22] Filed: Feb. 5, 1997

[51] Int. Cl.[6] .................................................. B32B 15/01
[52] U.S. Cl. ......................... 428/670; 428/192; 428/209; 428/415; 428/418; 428/426; 428/433; 428/434; 428/469; 428/666; 428/679; 428/680; 428/701; 338/262; 338/308; 204/192.17
[58] Field of Search .................................. 428/679, 666, 428/680, 689, 434, 702, 192, 194, 198, 209, 210, 415, 418, 426, 433, 469, 701, 670; 338/308, 262, 309, 314; 204/192.17, 192.23; 420/445; 75/252

[56] References Cited

U.S. PATENT DOCUMENTS

| | | | |
|---|---|---|---|
| 4,050,052 | 9/1977 | Reichelt et al. | 338/308 |
| 4,129,848 | 12/1978 | Frank et al. | 338/308 |
| 4,649,365 | 3/1987 | Furubayashi et al. | 338/25 |
| 4,791,398 | 12/1988 | Sittler et al. | 338/25 |
| 4,805,296 | 2/1989 | Jinda et al. | 29/620 |
| 4,952,904 | 8/1990 | Johnson et al. | 338/36 |
| 5,120,614 | 6/1992 | Hibner et al. | 428/679 |
| 5,518,521 | 5/1996 | Kuo | 75/252 |

*Primary Examiner*—Deborah Jones
*Assistant Examiner*—Abraham Bahta
*Attorney, Agent, or Firm*—Bo-In Lin

[57] ABSTRACT

The present invention discloses a substrate structure for supporting a thin film with specific temperature coefficient of resistance (TCR) thereon. The substrate structure includes a substrate composed of a borosilicate glass. The substrate further includes an interface layer of LaSiONx covering a top surface of the substrate. The substrate supports the thin film includes a platinum thin film thereon. The substrate structure further includes an adhesion anchoring seam disposed as a bonding seam interfacing the thin film to the substrate for securely attaching the thin film to the substrate therein. The bonding seam is disposed on a boundary edge of the thin film and includes a nickel-chromium alloy anchor seam disposed on the boding seam. In a preferred embodiment, the substrate structure includes a protective layer covering and protecting the substrate structure thereunder. In another preferred embodiment, the substrate structure further includes electrodes for electrically connecting to the thin film with the specific TCR for providing an electrical voltage thereto.

5 Claims, 3 Drawing Sheets

SUBSTRATE STRUCTURE WITH ADHESIVE ANCHORING-SEAMS FOR SECURELY ATTACHING AND BODING TO A THIN FILM SUPPORTED THEREON

BACKGROUND OF THE INVENTION

1. Field of the Invention

This invention relates generally to the structure and processes of device manufacture supported on a substrate. More particularly, this invention relates to an improved substrate structure and manufacture process to provide a stable and reliable attachment of the substrate structure to a thin film supported thereon without unduly affecting the functioning and performance characteristics of the device by employing a special seam-type anchoring bonding.

2. Description of the Prior Art

A sensing device manufactured by forming a thin metallic film on a substrate often presents special technical difficulties not yet resolved by those of ordinary skill in the art Specifically, in order to achieve higher level of sensing precision and sensitivity, structural integrity of the sensing device has to be comprised. This is often caused by the fact that as the structural integrity are improved by more securely attaching the sensing element to the supporting substrate, the materials and structural elements employed often adversely interfere with the measurements designed to be performed by the sensing element thus adding imprecision or lowering the measurement sensitivity.

A specific example is a flow sensor for measuring the variations of the rate of air flow by measuring the temperature changes resulting from such variations. As disclosed by Kumada in U.S. Pat. No. 5,038,609, entitled "Thermal Type Flow Detecting Apparatus" (issued on Aug. 13, 1991), a thermal type flow detecting apparatus is patented. The flow rate detecting apparatus includes a thermoelectric detecting element, i.e., a platinum thin film, formed on a base material of a ceramic semiconductor. The apparatus further has detecting electrodes arranged in the vicinity of both longitudinal ends on one major surface of the base material where the electrodes are formed opposed to each other with the base material interposed there-between on both surfaces of the base material in a central portion between both the detecting electrodes. The heating means, i.e., the platinum thin film, is structured by a heat generating resistor fixed to the base material. As the air flows over the heating means, a temperature variation occurs which in turn changes the resistance of the resistor because of the temperature coefficient of the resistance (TCR) of the platinum film used as the sensing element. By measuring the current variation, a corresponding variation of resistance and consequently the flow rate variation can be detected.

In order to provide a highly sensitive flow rate sensor, it is desirable that the flow sensing element is as thermally insulated as possible from the supporting substrate. Therefore, a substrate of very low thermal conductivity is suitable for such applications. However, a typical thermal insulating material, e.g., a glass substrate, produces a difficulty that the sensing element, e.g., a platinum thin film cannot be securely attached to the surface of such substrate. Problems with structural integrity and reliability often becomes a concern particularly when such flow sensors are applied in environments where the flow rate is high or mechanical impact to the sensor are not preventable. Loose connection of the sensor elements from the measuring electrodes connected thereto or peeling off of the platinum thin film from the supporting substrate are often potential problems which must be taken into consideration when design a highly sensitive flow rate sensor applying thin film technology.

Many prior art attempts are applied to resolve this difficulty. Jinda et al. disclose in U.S. Pat. No. 4,805,296 entitled "Method of Manufacturing Platinum Resistance Thermometer" (issued on Feb. 21, 1989) a method of manufacturing a resistance thermometer by preparing a support substrate and forming a platinum film serving as a temperature measuring element. The platinum is formed by a sputtering process containing a predetermined amount of oxygen gas. The resistance thermometer may further include an aluminum oxide film serving as a stabilizing layer to improve the stability and reproducibility of the sensor characteristics, namely the platinum layer. The aluminum layer is particularly useful for stabilizing the resistance temperature characteristics during a high temperature treatment of the resistor thermometer. FIG. 1 is included from Jinda's patent as a background structure for understanding the technology involved in this invention. A silicon substrate 1 is provided which is covered by an aluminum oxide layer 2 for supporting a platinum film 3 thereon. The platinum film is then patterned and provided with lead wires 5 for bonding to the opposite ends of the patterned platinum film. Jinda et al. employs an inexpensive glass as substrate and applies the aluminum oxide layer to provide adhesion for the platinum film to attach to the substrate and heat resistance to sustain the heat treatment. Adding the aluminum oxide film however does not provide a complete solution to the difficulty that the platinum film may still peel off during operation of the sensor as the aluminum oxide layer still does not securely adhere to the platinum film. The structural integrity is still a problem for a high precision TCR type of device especially when thin film technology is applied to make miniaturized devices.

Similar device structures are disclosed in many other patents. Reichelt et al. disclosed in U.S. Pat. No. 4,050,052, entitled "Electrical Temperature Measuring Resistor Structure Particularly for Resistance Thermometers" (issued Sep. 20, 1977) by forming the platinum film on a layer which has a temperature coefficient of expansion matching the platinum layer. The expansion layer disclosed is an aluminum oxide layer. Frank et al. disclosed in U.S. Pat. No. 4,129,848, entitled "Platinum Film Resistor Device" (issued Dec. 12, 1978) by sputtering the platinum film on a quartz and etch the film and the quartz to define the conducting paths of the resistor device. Furubayashi et al. disclosed in U.S. Pat. No. 4,649,365, entitled "Platinum Resistor for the Measurement of Temperature" (issued Mar. 10, 1987) by forming the platinum film on a silicon substrate overlaid with an aluminum oxide film. Sittler et al. disclosed in U.S. Pat. No. 4,791,398, entitled "The Film Platinum Resistance Thermometer with High Temperature Diffusion Barrier" (issued Dec. 13, 1988) by forming the platinum film on a silicon substrate overlaid with an barrier layer which is preferably a titanium oxide layer. All these devices, with similar structure as that of Jinda et al., are still limited by the same difficulty that the device structure is subject to weak attachment of the platinum film to the substrate structure.

Therefore, a need still exists in the art of design and manufacture of thin film TCR type of devices for measuring the temperature, flow rate or other types of operation conditions, to provide a novel and improved structure to resolve the difficulties generated by this weak structure configuration. This improved device is specially required for high precision, high speed flow rate measurements where the sensing elements are constantly subject to direct blow by the air flow. Assurance of high degree of structural integrity are in therefore in great demand. It is also desirable that the structure integrity can be improved without sacrificing the measurement sensitivity whereby implementation of the TCR types of sensing device can be broadly incorporated in various modem high precision, high speed applications.

SUMMARY OF THE PRESENT INVENTION

It is therefore an object of the present invention to provide a new structural configuration and manufacture method for providing a substrate structure to support a TCR thin film which would enable those of ordinary skill in the art to overcome the aforementioned difficulties and limitations encountered in the prior art.

Specifically, it is an object of the present invention to provide a new structural configuration and manufacture method for providing a substrate structure to support a TCR thin film wherein the TCR film is securely attached to the structure while maintaining high measurement sensitivity and precision.

Another object of the present invention is to provide a new structural configuration and manufacture method for providing a substrate structure to support a TCR thin film wherein a novel bonding seam is employed to anchor and bond the TCR film securely onto the substrate structure such that highly reliable devices can be manufactured and the measurement precision and sensitivity are not adversely affected.

Another object of the present invention is to provide a structural configuration and manufacture method for providing a substrate structure to support a TCR thin film wherein a novel bonding seam is employed to anchor and bond the TCR film which is further added by an interface layer including a rare earth element with good thermal insulation to bond to the TCR film such that the structure integrity is strengthened to assure that highly reliable devices can be manufactured and the measurement precision and sensitivity are not adversely affected.

Briefly, in a preferred embodiment, the present invention includes a substrate structure for supporting a thin film with specific temperature coefficient of resistance (TCR) thereon. The substrate structure includes a substrate composed of a borosilicate glass. The substrate further includes an interface layer of LaSiONx covering a top surface of the substrate. The substrate supports the thin film includes a platinum thin film thereon. The substrate structure further includes an adhesion anchoring means disposed on a bonding seam interfacing the thin film to the substrate for securely attaching the thin film to the substrate therein. The bonding seam is disposed on a boundary edge of the thin film and comprising a nickel-chromium alloy anchor means disposed on the boding seam. In a preferred embodiment, the substrate structure includes a protective layer covering and protecting the substrate structure thereunder. In another preferred embodiment, the substrate structure further includes electrode means for electrically connecting to the thin film with the specific TCR for providing an electrical voltage thereto.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
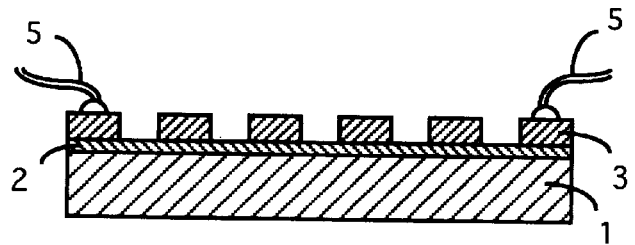
FIG. 1 is a cross sectional view showing the structure of flow rate detector according to an invention disclosed in an prior art patent.
Figure 2A:
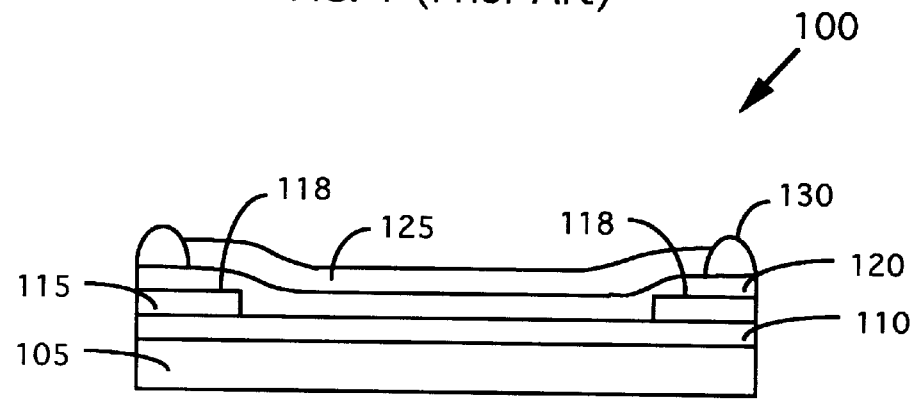
FIGS. 2A and 2B are a cross sectional view and a top view respectively of a substrate structure for supporting a TCR film thereon according to a structure and manufacture method of the present invention.
Figure 2B:
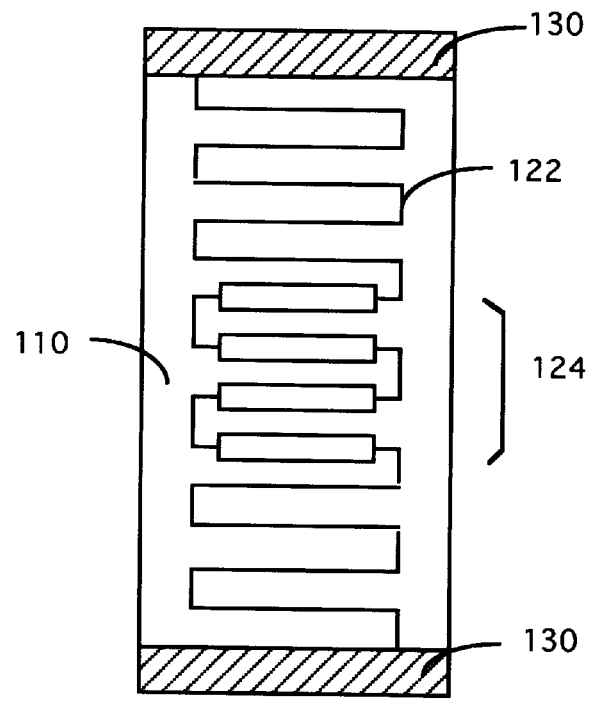

FIG. 2A is a cross sectional view and FIG. 2B is a top view of a substrate structure 100 of the present invention. The substrate structure 100 supports a thin film 120 with specific temperature coefficient of resistance (TCR), such as a platinum film 120 thereon. The platinum film 120 is formed as resistor circuit 122 includes a laser trim area 124 for trimming the width of the resistor circuit 122 to precisely adjust the resistance. In a preferred embodiment, the substrate structure 100 includes a substrate 105 may preferably composed of a borosilicate glass which has a thickness of approximately 0.1 to 0.2 millimeters. The substrate structure further includes an interface layer 110 composed of $LaSiON_x$—$Al_2O_3$ to provide better interface characteristics with the thin film 120 supported thereon. In a preferred embodiment, the thickness of this interface layer 110 ranges from 3000 to 4000 Angstroms. The interface layer 110 provided in this invention is better than a $Al_2O_3$ layer disclosed in the prior art because the component $LaSiON_x$ can form covalent bonding with the platinum film thus can provide stronger attachment to the platinum while the $Al_2O_3$ provides compatible interface with the silicon substrate 105 underneath the interface layer 110. In order to resolve the difficulties of the prior art, the substrate structure 100 further includes an adhesive anchoring means 115 for securely attaching the thin film to the substrate 105.

As shown in FIGS. 2A and 2B, the anchoring means 115 is disposed in a bonding seam 118 interfacing the thin film 120 to the substrate 105. This bonding seam 118 can be placed along a boundary edge of the thin film 120 or the adhesive anchoring means 115 disposed on the bonding seam 118 can be disposed strategically at certain locations for interfacing the thin film 120 to the substrate 105 depending on the relative position of the thin film 120 and the adhesion characteristics required for the adhesive anchoring means. In a preferred embodiment, the adhesive anchoring means 115 composed of an alloy containing chromium, e.g., a Ni—Cr alloy layer of approximately 1000 Angstroms in thickness. The adhesive anchoring means 115 is formed with materials containing atoms that can form covalent bonding to the TCR film 120. An important function is provided by this adhesive anchoring means 115. In a preferred embodiment, the Ni—Cr alloy contains approximately 60% of nickel and 40% of chromium. In a different embodiment, the adhesive anchoring means 115 also contains small amount of aluminum and silicon in the Ni—Cr alloy to enhance it interface with the interface layer 110 and the substrate 105. As the thin film, e.g., a platinum layer 120 of about one micron in thickness, is deposited onto the substrate 105 covered by the interface layer 110, secure attachment and stability is provided because of the adhesive anchoring means 115. The adhesive anchoring means 115 thus serve as a bonding seam securely interfacing and joining the thin film 120 to the substrate 105. A protective layer 125 which may be a polyimide layer is then formed to cover and protect the substrate structure 100 thereunder. A resistor package is completed with solder pads 130 on two ends of the substrate structure connected to the platinum resistor 122. The solder pads 130 are then employed for external connection and interface. The adhesive anchoring means 115 assure the platinum film 120 and the solder pads 130 are securely and attached to the substrate structure 100 with sufficient stability for long term reliable operation.

One major difficulty is resolved by the use of this adhesive anchoring means 115 which is formed as bonding seam right below the solder pads 130. The major problem arises from the fact that the solder pads 130, due to its great surface tension, tend to bond very strongly to the platinum film 120. A stronger bonding between the platinum film 120 to the solder pads 130 than its bonding to the substrate structure, e.g., an interface layer composed of $Al_2O_3$ as that employed in the prior art, causes the solder pads 130 bonded to the platinum film to peel off from the substrate structure 100. With this adhesive anchoring means 115, e.g., the adhesive seam composed of Ni—Cr alloy, disposed right under the solder pads 130, assures that the bonding between the platinum film 120 to the substrate structure 100 is stronger than the platinum film 120 to the solder pads 130. The peeling off phenomenon of the solder pads 130 together with the platinum film 120 is no longer a problem with this substrate structure manufactured according the teaching provided in this invention.

The novel structure of bonding seam 115 provides special advantage that only a small portion of the active areas of the thin film 120 are used in the bonding seam for tightly bonding to the substrate 105. The sensitivity of TCR variation of the thin film which is generally applied for detecting temperature variations or indirectly measuring the flow rate variations by sensing the current transmitted over the thin film is not adversely degraded by this seam structure. Furthermore, the bonding seams can be strategically and flexibly placed at locations not actively used for temperature sensing measurement. The precision and sensitivity of measurement would therefore not impacted by a more reliable structure provided in this invention.

In summary, the present invention discloses a substrate structure 100 for supporting a thin film 120 with specific temperature coefficient of resistance (TCR) thereon. The substrate structure 100 includes a substrate 105 composed of a borosilicate glass. The substrate 105 further includes an interface layer of LaSiONx 110 covering a top surface of the substrate 105. The substrate 105 supports the thin film 120 includes a platinum thin film thereon. The substrate structure 100 further includes an adhesion anchoring means 115 disposed on a bonding seam 118 interfacing the thin film 120 to the substrate 105 for securely attaching the thin film 120 to the substrate 105 therein. The bonding seam 115 is disposed on a boundary edge 118 of the thin film 120 and comprising a nickel-chromium alloy anchor means disposed on the boding seam 115. In a preferred embodiment, the substrate structure 100 includes a protective layer 125 covering and protecting the substrate structure thereunder. In another preferred embodiment, the substrate structure 100 further includes electrode means for electrically connecting to the thin film 120 with the specific TCR for providing an electrical voltage thereto.

More generally, the present invention also discloses a substrate structure 100 for supporting a thin film 120 with specific temperature coefficient of resistance (TCR) thereon. The substrate structure 100 includes an adhesion anchoring means 115 disposed on a bonding seam 118 interfacing the thin film 120 to the substrate 105 for securely attaching the thin film 120 to the substrate 105. In a preferred embodiment, the bonding seam 115 disposed on a boundary edge 118 of the thin film 120 for securely attaching to the substrate therein.

Figure 3A:
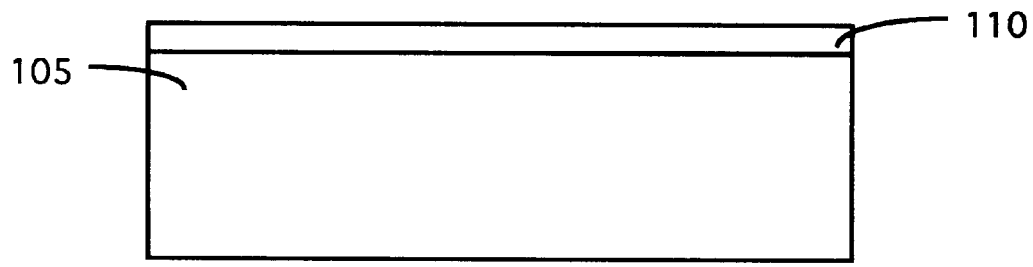
FIGS. 3A to 3E are side cross sectional views of a of the substrate structure of the present invention for illustrating the processing steps for making the substrate structure for supporting a TCR thin film with improved structure integrity.
Figure 3B:
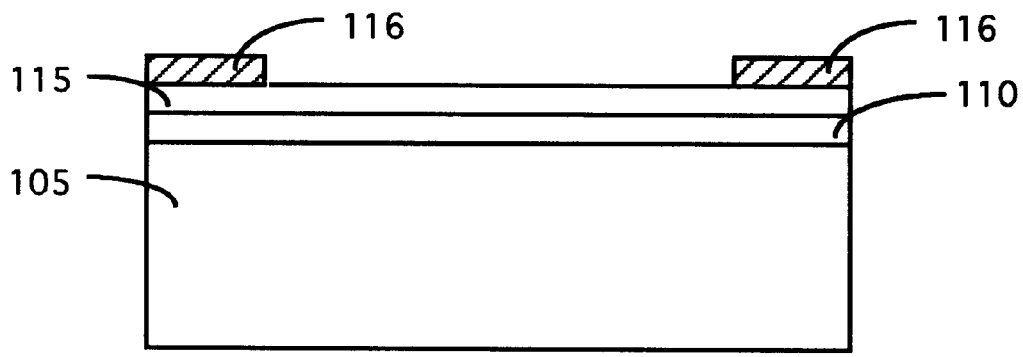

Please refer to FIGS. 3A to 3E which includes a series of cross sectional views for describing the processing steps of fabricating the substrate structure 100 for supporting a thin film 120 described above. In FIG. 3A, a substrate 105 is prepared and cleaned with a regular cleaning process. A first interface layer 110 is then formed on top of the substrate by applying an RF sputtering process. The RF sputtering process, for depositing a $LaSiON_x$—$Al_2O_3$ layer, may be carried out in a low pressure vacuum chamber with a pressure of $10^{-6}$ to $5 \times 10^{-6}$ torr at a temperature of about 50° C. to form an interface layer 110 of about 3000 Angstroms. A bonding layer 115 composed of Ni—Cr alloy is then deposited on top of the interface layer 110 by employing a sputtering process again carried out in the low pressure vacuum chamber at a slightly higher temperature ranging from 75 to 120° C. to form a thin bonding layer 115 of about 1000 Angstroms. A photo-resist 116 is then applied over the bonding layer 115 to define an etch area by exposing the etch area to a photo-process according to a photo-lithographic process commonly practiced in manufacturing the integrated circuit (IC).

Figure 3C:
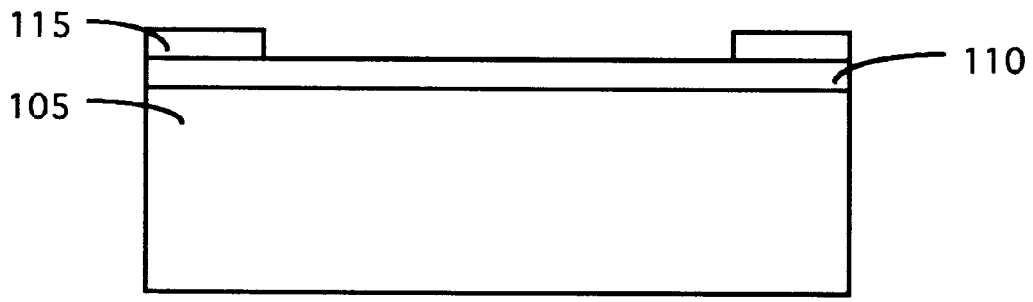
Figure 3D:
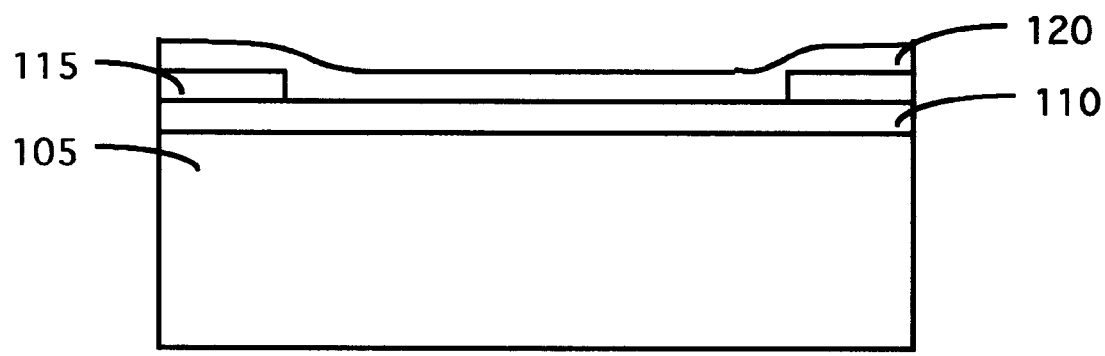
Figure 3E:
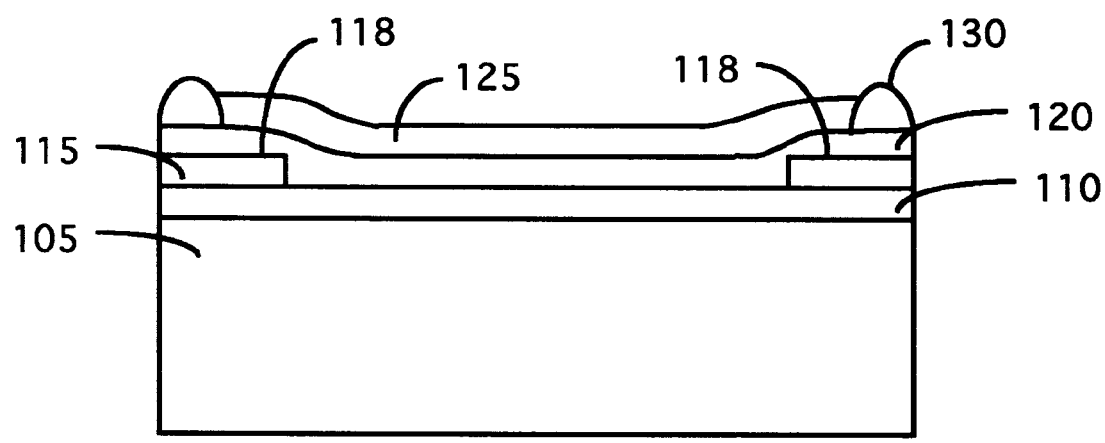

Please referring to FIG. 3C, the exposed etch area is etched away to pattern the bonding seams 115 at the predetermined locations. The photo-resist 116 is then stripped. Referring to FIG. 3D, a thin platinum layer 120 is then deposited on top of the substrate structure 100. The bonding seam 115 serving as a adhesion anchoring means to securely bond and join the platinum layer 120 onto the substrate structure 100. The platinum layer 120 can then be patterned, again by etching or laser trimming processes, to define platinum strips on the substrate structure 100 for conducting electric current via these platinum strips. Referring to FIG. 3E, the solder pads 130 are then coated over two ends of the substrate structure 100 to function as electrodes for external connection. Then, the substrate structure 100 supporting the platinum layer 120 or a layer composed of material with specific temperature coefficients of resistance (TCR) which is anchored and adhered to the substrate 105 by the use of bonding seams 115 is covered and protected by forming an over-coating layer 125 on top of the platinum layer 125. This over coating layer may be a polyimide layer deposited by applying a spin coating process then heated at a temperature between 350 to 450° C. The TCR device supported on this substrate structure 100 can further be connected to electrodes (not shown) for applying a voltage over the platinum strips for conducting an electric current. The electronic device for measuring or controlling temperatures or measuring flow rate variations with a stable TCR thin film securely attached is fabricated in this invention.

This invention also discloses a method for manufacturing a substrate structure 100 for supporting a thin film 120 with specific temperature coefficient of resistance (TCR) thereon. The method includes the steps of (a) providing a substrate 105 composed of a borosilicate glass; (b) depositing an interface layer 110 of LaSiONx covering a top surface of the substrate 105; (c) forming a bonding layer 115 of nickel chromium on top of the interface layer and patterning the bonding layer into an adhesion anchoring means 115 by etching a bonding seam; and (d) depositing the thin film 120 with the specific TCR composed of platinum with the bonding seam 115 interfacing the thin film to bond to the substrate 105 for securely attaching the thin film 120 to the substrate 105 therein on a boundary edge 118 of the thin film 120. In a preferred embodiment, the method further includes a step of forming solder pads 130 in electrical connection with the thin film 120 and a protective layer 125 covering and protecting the substrate structure 100 thereunder.

Therefore, the present invention provides a new structural configuration and manufacture method for providing a substrate structure to support a TCR thin film which would enable those of ordinary skill in the art to overcome the difficulties and limitations of the prior art. Specifically, a substrate structure to support a TCR thin film is provided wherein the TCR film is securely attached to the structure while maintaining high measurement sensitivity and precision. This is achieved by employing a novel bonding seam to anchor and bond the TCR film securely onto the substrate structure such that highly reliable devices can be manufactured and the measurement precision and sensitivity are not adversely affected. In addition to the novel bonding seam, the substrate structure is further added by an interface layer including a rare earth element with good thermal insulation to bond to the TCR film such that the structure integrity is strengthen to assure that highly reliable devices are manufactured.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A substrate structure for supporting a conductive film with specific temperature coefficient of resistance (TCR) thereon, comprising:

a substrate composed of a borosilicate glass;

said substrate further includes an interface layer of LaSiONx covering and attached to a top surface of said substrate where X representing a real number;

said substrate supports said conductive film composed of platinum overlying and attached to said interface layer;

an adhesion anchoring means disposed on a bonding seam interfacing between said film and said interface layer for securely attaching said film to said interface layer and said substrate; and said bonding seam of an elongated strip disposed on a boundary edge of said film and comprising a nickel-chromium alloy anchor means disposed on said bonding seam under said film and above said interface layer provided for forming solder pads above said film thereon whereby a peeling-off of said solder pad together with said film from said substrate of borosilicate glass is prevented.

2. The substrate structure of claim 1 further comprising:

said solder pads being in electric connection with said platinum film disposed on boundary edges of said substrate above said bonding seam to function as electrodes for external connection.

3. The substrate structure of claim 2 further comprising:

a protective layer covering over said conductive film and protecting said substrate structure thereunder.

4. The substrate structure of claim 1 further wherein:

said substrate further includes an interface layer of LaSiONx—Al$_2$O$_3$ covering a top surface of said substrate.

5. A substrate structure for supporting a conductive film with specific temperature coefficient of resistance (TCR) thereon, comprising:

an interface layer composed of LaSiONx—Al$_2$O$_3$ covering a top surface of said substrate underneath said film where X representing a real number;

an adhesion anchoring means disposed on a bonding seam as an elongated stripe along a boundary edge of said substrate structure interfacing said film to said substrate for securely attaching said film to said interface layer and said substrate.

* * * * *